(12) United States Patent
Ma et al.

(10) Patent No.: US 11,803,641 B2
(45) Date of Patent: Oct. 31, 2023

(54) UTILIZING MACHINE LEARNING TO DETECT MALICIOUS EXECUTABLE FILES EFFICIENTLY AND EFFECTIVELY

(71) Applicant: Zscaler, Inc., San Jose, CA (US)

(72) Inventors: Changsha Ma, Campbell, CA (US); Nirmal Singh, Mohali (IN); Naveen Selvan, Mohali (IN); Tarun Dewan, Mohali (IN); Uday Pratap Singh, Mohali (IN); Deepen Desai, San Ramon, CA (US); Bharath Meesala, Bengaluru (IN); Rakshitha Hedge, Bengaluru (IN); Parnit Sainion, Morgan Hill, CA (US); Shashank Gupta, Sunnyvale, CA (US); Narinder Paul, Sunnyvale, CA (US); Rex Shang, Los Altos, CA (US); Howie Xu, Palo Alto, CA (US)

(73) Assignee: Zscaler, Inc., San Jose, CA (US)

( * ) Notice: Subject to any disclaimer, the term of this patent is extended or adjusted under 35 U.S.C. 154(b) by 355 days.

(21) Appl. No.: 17/079,809

(22) Filed: Oct. 26, 2020

(65) Prior Publication Data
US 2022/0083659 A1 Mar. 17, 2022

(30) Foreign Application Priority Data
Sep. 11, 2020 (IN) .............................. 202011039471

(51) Int. Cl.
*G06F 21/56* (2013.01)
*G06F 21/53* (2013.01)
*G06N 20/00* (2019.01)

(52) U.S. Cl.
CPC ............ *G06F 21/565* (2013.01); *G06F 21/53* (2013.01); *G06N 20/00* (2019.01); *G06F 2221/033* (2013.01)

(58) Field of Classification Search
CPC ..................................................... G06F 21/565
See application file for complete search history.

(56) References Cited

U.S. PATENT DOCUMENTS

| | | | |
|---|---|---|---|
| 8,549,581 B1 | 10/2013 | Kailash et al. | |
| 8,607,066 B1 | 12/2013 | Kailash et al. | |
| 8,887,249 B1 | 11/2014 | Schekochikhin et al. | |
| 9,152,789 B2 | 10/2015 | Natarajan et al. | |
| 11,210,392 B2 * | 12/2021 | Salem .................... | G06F 21/54 |

(Continued)

OTHER PUBLICATIONS

Jordaney, Roberto, et al. "Transcend: Detecting concept drift in malware classification models." 26th {USENIX} Security Symposium ({USENIX} Security 17). 2017.

(Continued)

*Primary Examiner* — Simon P Kanaan
(74) *Attorney, Agent, or Firm* — Baratta Law PLLC; Lawrence A. Baratta, Jr.; Ryan Odessa

(57) ABSTRACT

Systems and methods include determining a plurality of features associated with executable files, wherein the plurality of features are each based on static properties in predefined structure of the executable files; obtaining training data that includes samples of benign executable files and malicious executable files; extracting the plurality of features from the training data; and utilizing the extracted plurality of features to train a machine learning model to detect malicious executable files.

20 Claims, 6 Drawing Sheets

(56) References Cited

U.S. PATENT DOCUMENTS

| | | | | |
|---|---|---|---|---|
| 11,444,957 | B2* | 9/2022 | Zhang | G06N 3/088 |
| 2005/0038790 | A1* | 2/2005 | Wolthusen | H04L 41/0893 |
| 2007/0233477 | A1 | 10/2007 | Halowani et al. | |
| 2010/0115621 | A1 | 5/2010 | Staniford et al. | |
| 2016/0344770 | A1 | 11/2016 | Verma et al. | |
| 2017/0063886 | A1 | 3/2017 | Muddu et al. | |
| 2018/0150758 | A1 | 5/2018 | Niininen et al. | |
| 2018/0293381 | A1* | 10/2018 | Tseng | G06N 20/20 |
| 2022/0036208 | A1* | 2/2022 | Rao | G06N 5/04 |
| 2022/0067146 | A1* | 3/2022 | Cai | G06F 21/566 |
| 2022/0083659 | A1* | 3/2022 | Ma | G06F 21/565 |

OTHER PUBLICATIONS

Kantchelian, Alex, J. D. Tygar, and Anthony Joseph. "Evasion and hardening of tree ensemble classifiers." International Conference on Machine Learning. 2016.

Tolomei, Gabriele, et al. "Interpretable predictions of tree-based ensembles via actionable feature tweaking." Proceedings of the 23rd ACM SIGKDD International Conference on Knowledge Discovery and Data Mining. ACM, 2017.

* cited by examiner

UTILIZING MACHINE LEARNING TO DETECT MALICIOUS EXECUTABLE FILES EFFICIENTLY AND EFFECTIVELY

FIELD OF THE DISCLOSURE

The present disclosure relates generally to networking and computing. More particularly, the present disclosure relates to systems and methods utilizing Machine Learning (ML) to detect malicious executable files, namely Portable Executable (PE) files, efficiently and effectively.

BACKGROUND OF THE DISCLOSURE

The Portable Executable (PE) format is a file format for executables, object code, Dynamic Link Libraries (DLLs), and others used in 32-bit and 64-bit versions of Windows Operating Systems, e.g., EXE file. The PE format is a data structure that encapsulates the information necessary for the Windows OS loader to manage the wrapped executable code. These files are referred to herein as executable files. An executable file causes a computer to perform indicated tasks according to encoded instructions, as opposed to a data file that must be parsed by a program to be meaningful. Executable files are potentially dangerous because they can contain code or execute arbitrary commands, i.e., an executable file could potentially perform any action. This means it is imperative to detect and block malicious executable files.

Machine Learning (ML) techniques are proliferating and offer many use cases. In network and computer security, there are various use cases for machine learning, such as malware detection, identifying malicious files for further processing such as in a sandbox, user risk determination, content classification, intrusion detection, phishing detection, etc. The general process includes training where a machine learning model is trained on a dataset, e.g., data including malicious and benign content or files, and, once trained, the machine learning model is used in production to classify unknown content based on the training. One prevalent approach is to avoid using knowledge features but leverage non-knowledge features such as using n-gram of executable files, using image structure after converting executable files into images, etc. This approach theoretically can produce a good result. However, this approach requires a large training dataset and a long training cycle, leading to a high cost. The high cost is associated with training, optimizing, and updating the machine learning model. This leads to challenges to deliver trained machine learning models for production. A long training time either requires a very long optimization process for good results or a relatively short optimization process for suboptimal results. In fact, the conventional approach can require training times in days, which means updating the machine learning model takes a significant amount of time and effort, resulting in a low agility.

The present disclosure relates to Machine Learning (ML) techniques that detect malicious executable files, namely, Portable Executable (PE) files, efficiently and effectively.

BRIEF SUMMARY OF THE DISCLOSURE

The present disclosure relates to systems and methods systems and methods utilizing Machine Learning (ML) to detect malicious executable files, namely, Portable Executable (PE) files, efficiently and effectively. Specifically, the present disclosure utilizes knowledge gained in production to provide a set of features for model training. The conventional approach relies on non-knowledge features for training (e.g., n-gram features), and this approach requires a large training dataset and a long training cycle. The present disclosure, on the other hand, utilizes insights and knowledge on the features, leading to a small training dataset and a short training cycle. That is, the comparison of training datasets and training cycles is between the conventional, byte-level features relative to the present disclosure's knowledge-based features. For an example comparison, the present disclosure's approach can include a training dataset that less than half the size of the conventional, byte-level features and a training time that is more than an order of magnitude less in time. Additionally, the approach described herein also yields improved accuracy. Thus, the use of insights and knowledge for training features can provide smaller training datasets, less training time, while achieving better accuracy.

In various embodiments, the present disclosure includes a method with various steps, a server configured to implement the steps, and a non-transitory computer-readable storage medium having computer-readable code stored thereon for programming one or more processors to perform the steps. The steps include determining a plurality of features associated with executable files, wherein the plurality of features are each based on static properties in predefined structure of the executable files; obtaining training data that includes samples of benign executable files and malicious executable files; extracting the plurality of features from the training data; and utilizing the extracted plurality of features to train a machine learning model to detect malicious executable files.

The steps can include providing the machine learning model for use in production to detect executable files. The steps can include obtaining data related to use of the machine learning model in production; and updating the training of the machine learning model based on the data. The machine learning model is used in production in a cloud-based system, and wherein the updated trained machine learning model is distributed to a plurality of enforcement nodes via a central authority. The steps can include obtaining data related to a sandbox of executable files; and updating the plurality of features based on the data. The sandbox can be associated with a cloud-based system. The executable file can be a Portable Executable (PE) file. The static properties can include any of file header information, file section details, file name anomalies, a digital certificate, and import/export detail.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2A is a block diagram of a server that may be used in the cloud-based system of FIGS. 1A and 1B or the like;

FIG. 2B is a block diagram of a user device that may be used with the cloud-based system of FIGS. 1A and 1B or the like;

DETAILED DESCRIPTION OF THE DISCLOSURE

Again, the present disclosure relates to systems and methods systems and methods utilizing Machine Learning (ML) to detect malicious executable files, namely, Portable Executable (PE) files, efficiently and effectively. Specifically, the present disclosure utilizes knowledge gained in production to provide a set of features for model training. The conventional approach relies on byte-level features for training (e.g., n-gram features), and this approach requires a large training dataset and a long training cycle. The present disclosure, on the other hand, utilizes insights and knowledge on the features, leading to a small training dataset and a short training cycle. That is, the comparison of training datasets and training cycles is between the conventional, non-knowledge features relative to the present disclosure's knowledge-based features. For an example comparison, the present disclosure's approach can include a training dataset that less than half the size of the conventional, byte-level features and a training time that is more than an order of magnitude less in time. Additionally, the approach described herein also yields improved accuracy. Thus, the use of insights and knowledge for training features can provide smaller training datasets, less training time, while achieving better accuracy.

Example Cloud-Based System

Figure 1A:
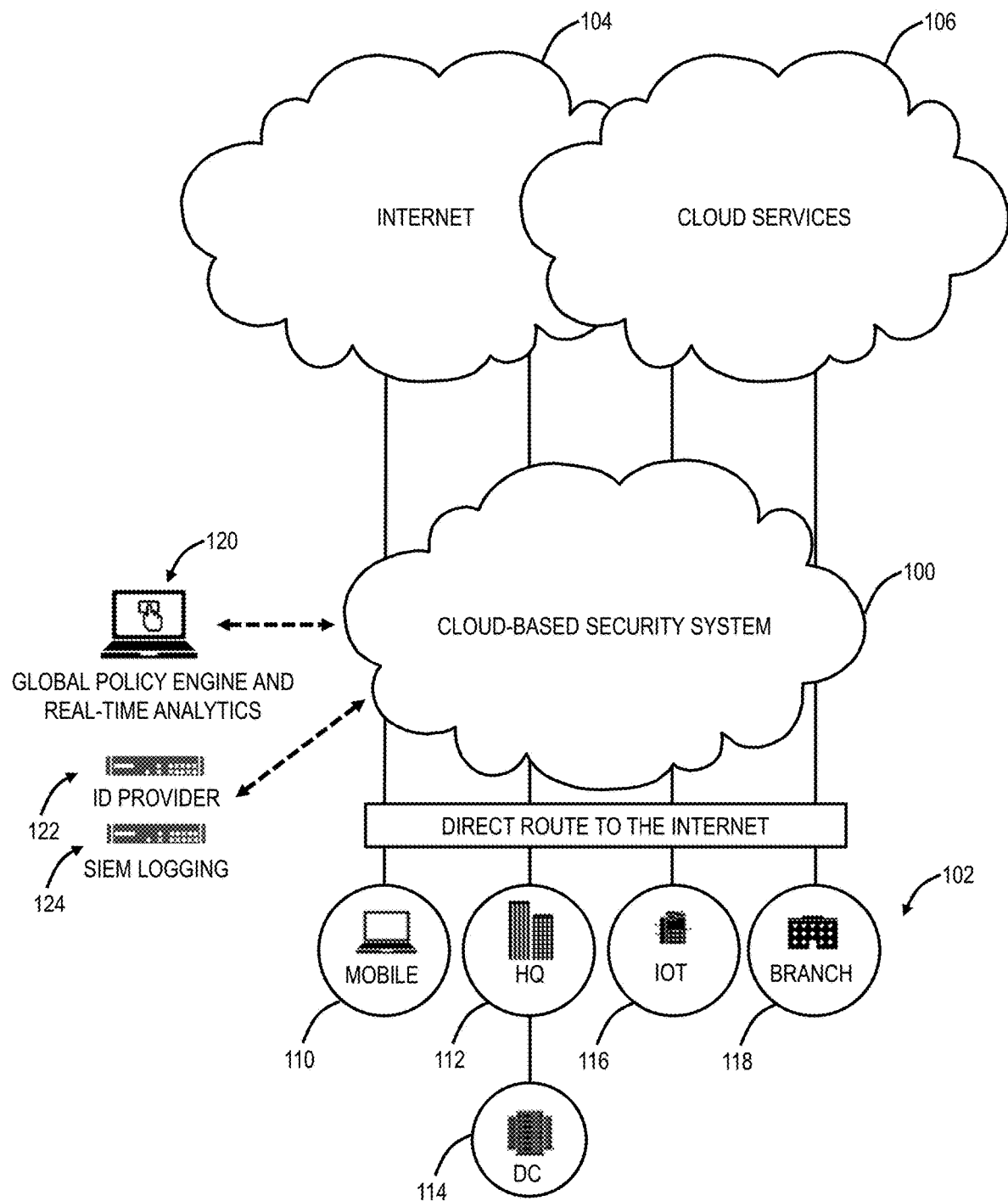
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering (content classification) can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 3:
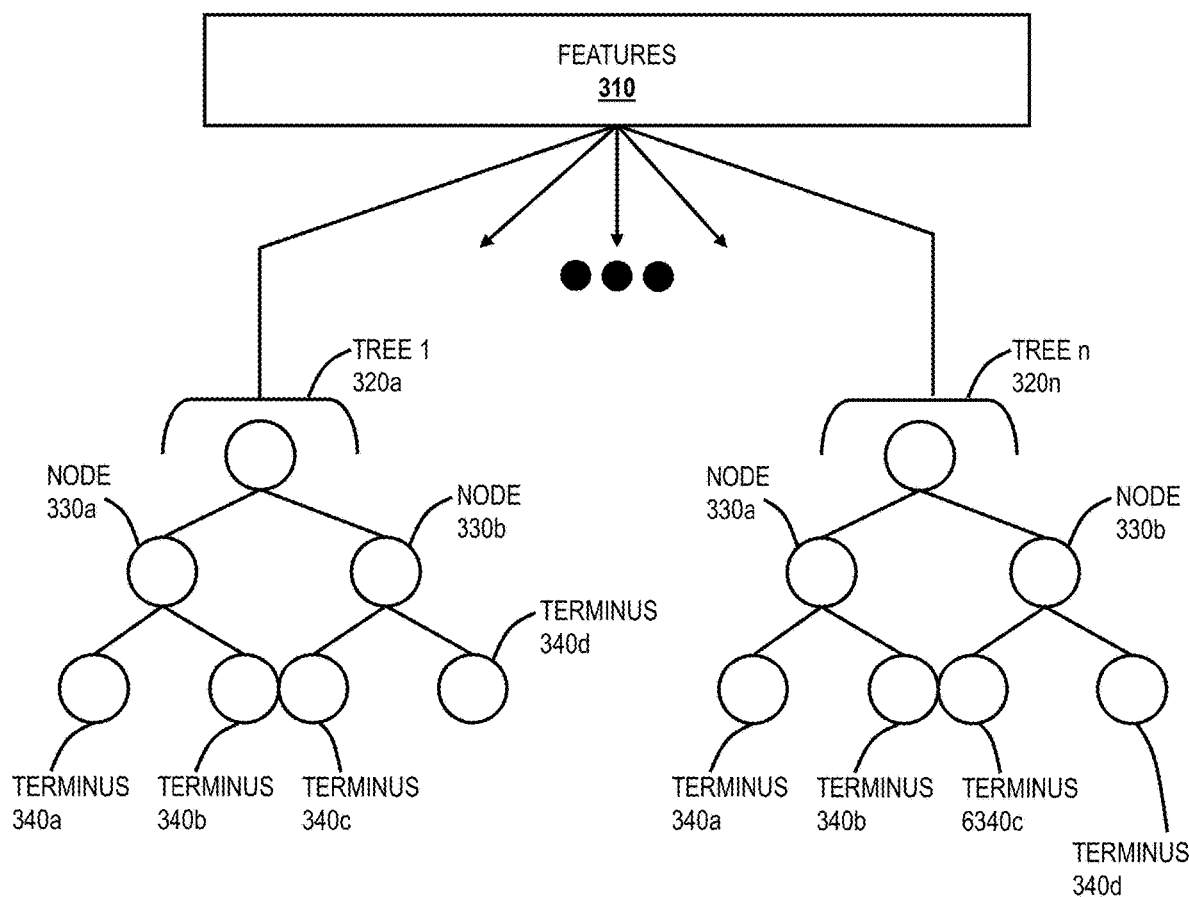
FIG. 3 is a diagram of a trained machine learning model in the form of a decision tree.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 106) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116 can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 1B:
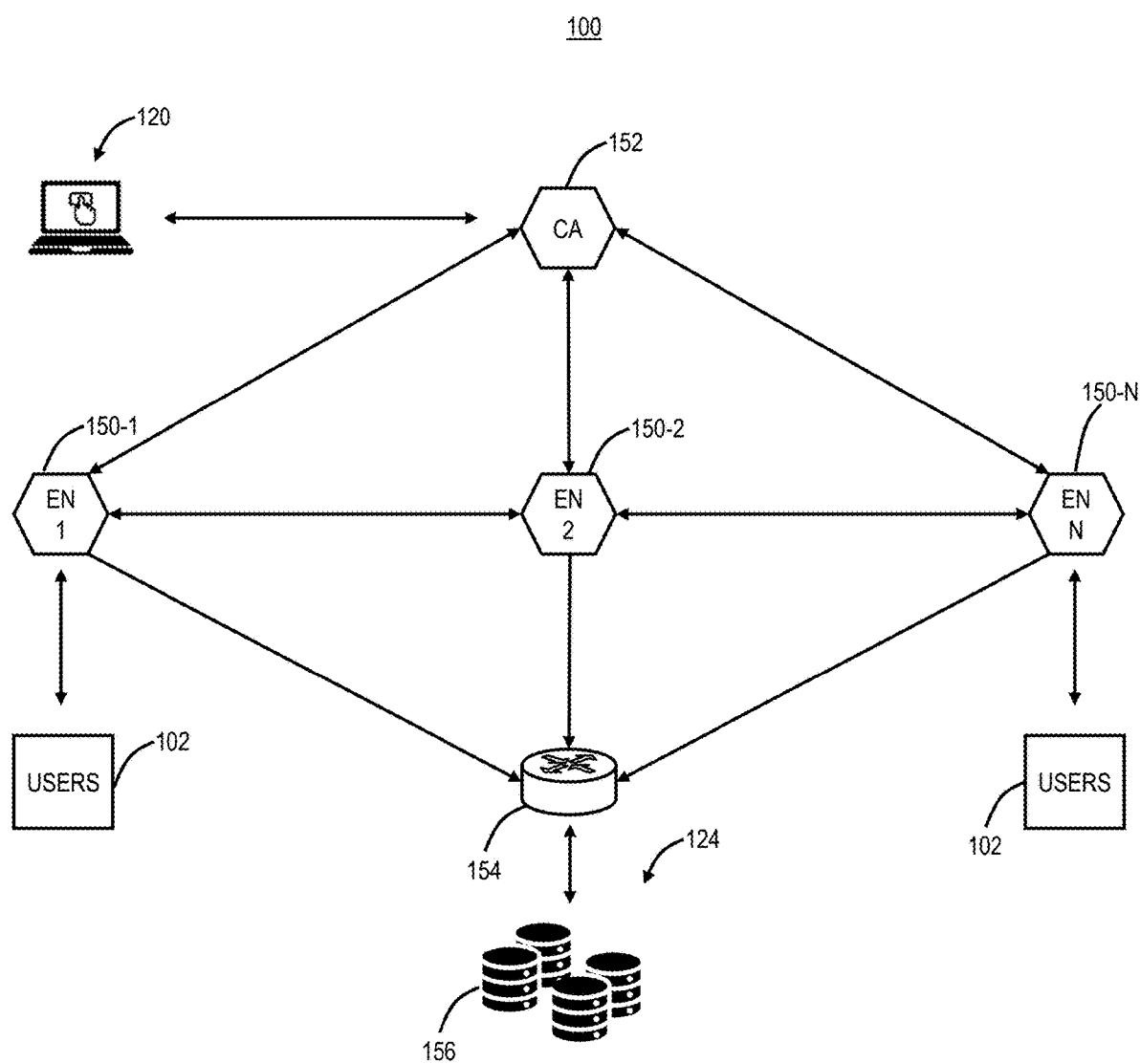
FIG. 1B is a network diagram of an example implementation of the cloud-based system.

FIG. 1B is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (VM) executed on physical hardware, etc. That is, a single node 150, 152 can be a cluster of devices. An example of a server is illustrated in FIG. 2. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization.

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

Once downloaded, a tenant's policy is cached until a policy change is made in the management system 120. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 2A:
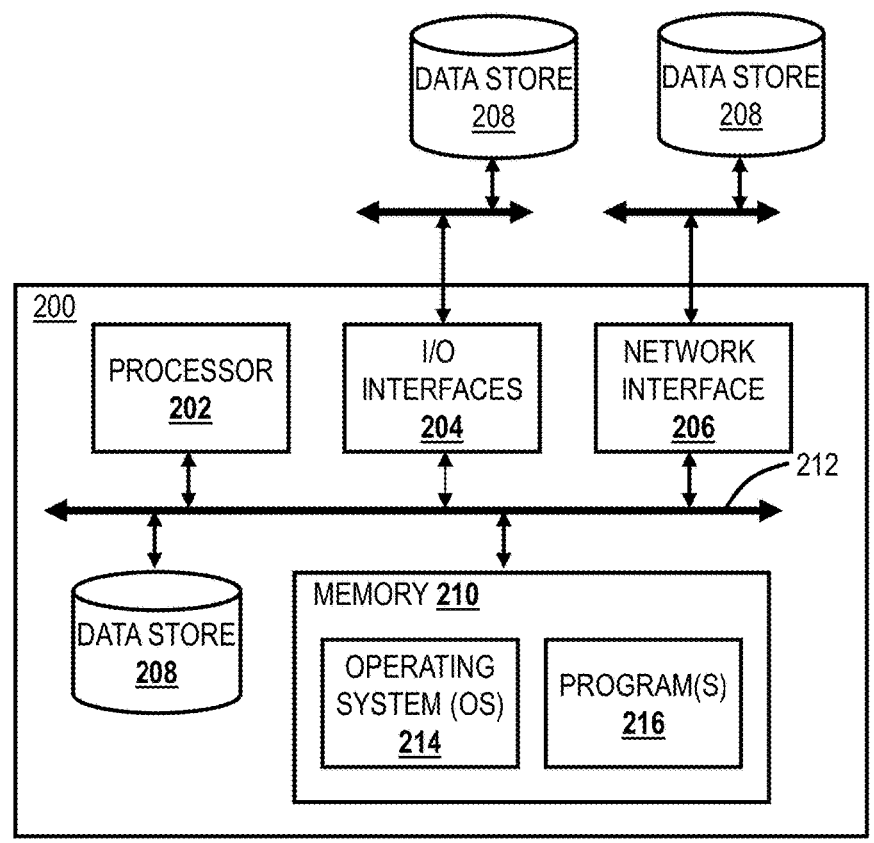

FIG. 2A is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2A depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 2B:
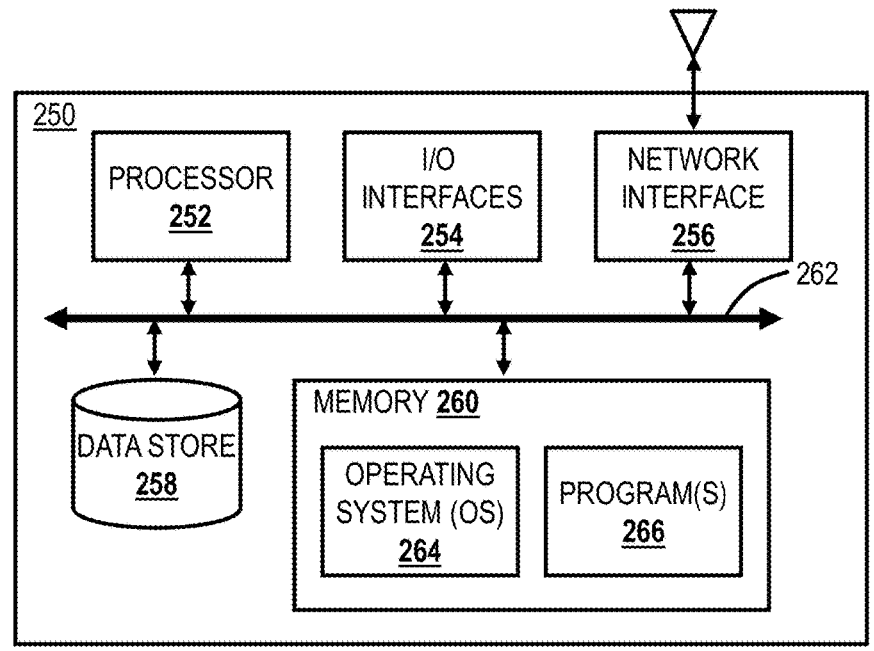

FIG. 2B is a block diagram of a user device 250, which may be used with the cloud-based system 100 or the like. Specifically, the user device 250 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 250 can be a digital device that, in terms of hardware architecture, generally includes a processor 252, I/O interfaces 254, a network interface 256, a data store 258, and memory 260. It should be appreciated by those of ordinary skill in the art that FIG. 2B depicts the user device 250 in an oversimplified manner, and a practical embodiment may include additional components and suitably configured processing logic to support known or conventional operating features that are not described in detail herein. The components (252, 254, 256, 258, and 252) are communicatively coupled via a local interface 262. The local interface 262 can be, for example, but not limited to, one or more buses or other wired or wireless connections, as is known in the art. The local interface 262 can have additional elements, which are omitted for simplicity, such as controllers, buffers (caches), drivers, repeaters, and receivers, among many others, to enable communications. Further, the local interface 262 may include address, control, and/or data connections to enable appropriate communications among the aforementioned components.

The processor 252 is a hardware device for executing software instructions. The processor 252 can be any custom made or commercially available processor, a CPU, an auxiliary processor among several processors associated with the user device 250, a semiconductor-based microprocessor (in the form of a microchip or chipset), or generally any device for executing software instructions. When the user device 250 is in operation, the processor 252 is configured to execute software stored within the memory 260, to communicate data to and from the memory 260, and to generally control operations of the user device 250 pursuant to the software instructions. In an embodiment, the processor 252 may include a mobile-optimized processor such as optimized for power consumption and mobile applications. The I/O interfaces 254 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LC D), touch screen, and the like.

The network interface 256 enables wireless communication to an external access device or network. Any number of suitable wireless data communication protocols, techniques, or methodologies can be supported by the network interface 256, including any protocols for wireless communication. The data store 258 may be used to store data. The data store 258 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 258 may incorporate electronic, magnetic, optical, and/or other types of storage media.

The memory 260 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 260 may incorporate electronic, magnetic, optical, and/or other types of storage media. Note that the memory 260 may have a distributed architecture, where various components are situated remotely from one another, but can be accessed by the processor 252. The software in memory 260 can include one or more software programs, each of which includes an ordered listing of executable instructions for implementing logical functions. In the example of FIG. 2B, the software in the memory 260 includes a suitable operating system 264 and programs 266. The operating system 264 essentially controls the execution of other computer programs and provides scheduling, input-output control, file and data management, memory management, and communication control and related services. The programs 266 may include various applications, add-ons, etc. configured to provide end user functionality with the user device 250. For example, example programs 266 may include, but not limited to, a web browser, social networking applications, streaming media applications, games, mapping and location applications, electronic mail applications, financial applications, and the like. In a typical example, the end-user typically uses one or more of the programs 266 along with a network such as the cloud-based system 100.

Machine Learning in Network Security

Machine learning can be used in various applications, including malware detection, intrusion detection, threat classification, the user or content risk, detecting malicious clients or bots, etc. In a particular use case in the present disclosure, machine learning can be used on an Office document, e.g., a file, detected during inline monitoring in the cloud-based system 100, to detect malware therein. That is, a machine learning model is built and trained as described herein to detect malicious Office documents. It follows that the machine learning predictions require high precision due to the impact of a false prediction, i.e., finding a malicious file to be benign.

A description utilizing machine learning in the context of malware detection is described in commonly-assigned U.S. patent application Ser. No. 15/946,546, filed Apr. 5, 2018, and entitled "System and method for malware detection on a per packet basis," the content of which is incorporated by reference herein. As described here, the typical machine learning training process collects millions of malware samples, extracts a set of features from these samples, and feeds the features into a machine learning model to determine patterns in the data. The output of this training process is a machine learning model that can predict whether a file that has not been seen before is malicious or not.

Decision Tree

In an embodiment, a generated machine learning model is a decision tree. A trained model may include a plurality of decision trees. Each of the plurality of decision trees may include one or more nodes, one or more branches, and one or more termini. Each node in the trained decision tree represents a feature and a decision boundary for that feature. Each of the one or more termini is, in turn, associated with an output probability. Generally, each of the one or more nodes leads to another node via a branch until a terminus is reached, and an output score is assigned.

FIG. 3 is a diagram of a trained machine learning model 300. The machine learning model 300 includes one or more features 310 and multiple trees 320$a$, 320$n$. A feature is an individual measurable property or characteristic of a phenomenon being observed. The trees 320$a$, 320$n$ can be decision trees associated with a random forest or a gradient boosting decision trees machine learning model. In various embodiments, the trees 320$a$, 320$b$ are constructed during training. While the machine learning model 300 is only depicted as having trees 320$a$, 320$n$, in other embodiments, the machine learning model 300 includes a plurality of additional trees. The features 310, in the context of malicious file detection, relate to various properties or characteristics of the file.

The trees 320$a$, 320$n$ include nodes 330$a$, 330$b$ and termini 340$a$, 340$b$, 340$c$, 340$d$. That is, the node 330$a$ is connected to termini 340$a$, 340$b$ and the node 330$b$ is connected to termini 340$c$, 340, via one or more branches. In other embodiments, the trees 320$a$, 320$n$ include one or more additional nodes, one or more additional branches, and one or more additional termini. The nodes 330 each represent a feature and a decision boundary for that feature. The termini 340 can each be associated with a probability of maliciousness, in the example of malicious file detection. Generally, each of the one or more nodes leads to another node via a branch until a terminus is reached, and a probability of maliciousness is assigned. The output of the trained machine learning model 300 is a weighted average of a probability of maliciousness predicted by each of the trees 320a and the tree 320n.

Malware Detection in Executable Files

Again, as described herein, executable files include a file format for executables, object code, DLLs and others used in 32-bit and 64-bit versions of Windows operating systems. The PE format is a data structure that encapsulates the information necessary for the Windows OS loader to manage the wrapped executable code. Example filename extensions include .ACM, .AX, .CPL, .DLL, .DRV, .EFI, .EXE, .MUI, .OCX, .SCR, .SYS, .TSP, etc.

Production data or traffic refers to content associated with the users 102 and the user devices 300. For example, production data can be monitored using the cloud-based system 100 via an enforcement node 150. Of course, other embodiments are contemplated, such as via a server 200, via a software application executed on the user device 300, etc.

Training data or traffic refers to content used to train a machine learning model for detecting malicious executable files. The training data is selected based on features in the executable files and more particularly based on the insight that, based on monitoring executable files in production, it has been determined certain features that are more efficient and effective to use for training and for features. These features can be referred to as domain knowledge, which has been gained based on insight from reviewing actual monitored data based on the operation of the cloud-based system 100.

Machine Learning Training Process for Detecting Malicious Executable Files

Figure 4:
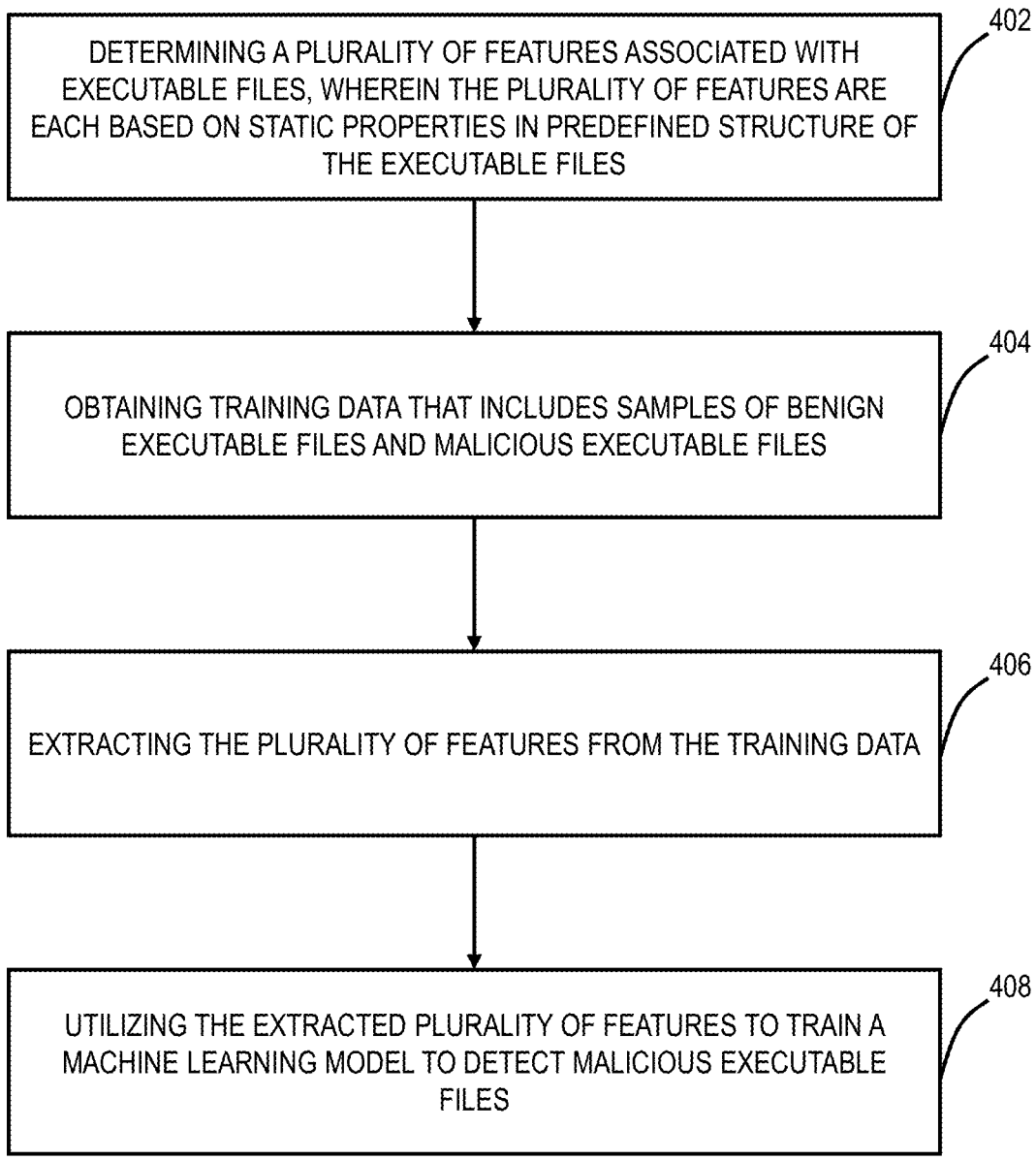
FIG. 4 is a flowchart of a machine learning process for detecting malicious executable files.

FIG. 4 is a flowchart of a machine learning process 400 for detecting malicious executable files. The machine learning process 400 contemplates implementation as a method having steps, via a processing device such as the server 200, the enforcement node 152, etc. that is configured to implement the steps, and as computer-readable code stored in a non-transitory computer-readable storage medium for programming one or more processors to perform the steps. Further, the machine learning process 400 contemplates operation within the cloud-based system 100 as well as independent from the cloud-based system 100.

The machine learning process 400 includes determining a plurality of features associated with executable files, wherein the plurality of features are each based on static properties in predefined structure of the executable files (step 402); obtaining training data that includes samples of benign executable files and malicious executable files (step 404); extracting the plurality of features from the training data (step 406); and utilizing the extracted plurality of features to train a machine learning model to detect malicious executable files (step 408).

Specifically, PE files include a structure that helps the Windows loader to load the executable files (.SYS, .DLL, .EXE) into memory. The static fields of this predefined structure provide a variety of information and vary with each binary. In the present disclosure, referred to as machine learning training based on knowledge features, these distinguishable static properties of the PE are used to train the machine learning model. These knowledge features may be used with some easily learnable existing non-knowledge (the conventional approach) as well, such as n-grams, entropy, file size, etc.

The machine learning process 400 can include providing the machine learning model for use in production to detect executable files. The machine learning process 400 obtaining data related to the use of the machine learning model in production; and updating the training of the machine learning model based on the data. Specifically, the machine learning model is trained and then used in production. However, new malicious files are seen over time, and the machine learning model can lose effectiveness over time. For example, the machine learning model can be used in production in the cloud-based system 100, and the updated trained machine learning model can be distributed to a plurality of enforcement nodes 150 via a central authority 152. An important aspect of the present disclosure is retraining the machine learning model is efficient (hours, not days). This is key for updating based on what is seen in production.

Note, the production effectiveness can be determined based on sandboxing relative to the classification of the machine learning model. For example, the machine learning model can provide a result, e.g., an executable is malicious or benign. Also, the sandbox can provide a result, malicious or benign. When the sandbox results start to diverge from the machine learning model, it may be required to retrain the machine learning model. Also, the machine learning process 400 can include obtaining data related to a sandbox of executable files; and updating the plurality of features based on the data. That is, the selection of the features used herein is based on insights from production. The sandbox can be associated with the cloud-based system 100. The executable file can be a Portable Executable (PE) file.

The static properties can include any of the file header information, file section details, file name anomalies, a digital certificate, and import/export detail. For the file header information, the PE contains rich information for interacting with the Windows loader. These various values infer vital information for static classification. For PE section details, memory is divided into segments for accessing big memory blobs. These details of divided chunks are used as features. For the digital certificate, cryptography plays a major role in validating clean binaries. The signer information helps to narrow down the origin. For import/export detail, various resolved APIs help to understand the run-time behavior of the binary.

Example Results

Figure 5:
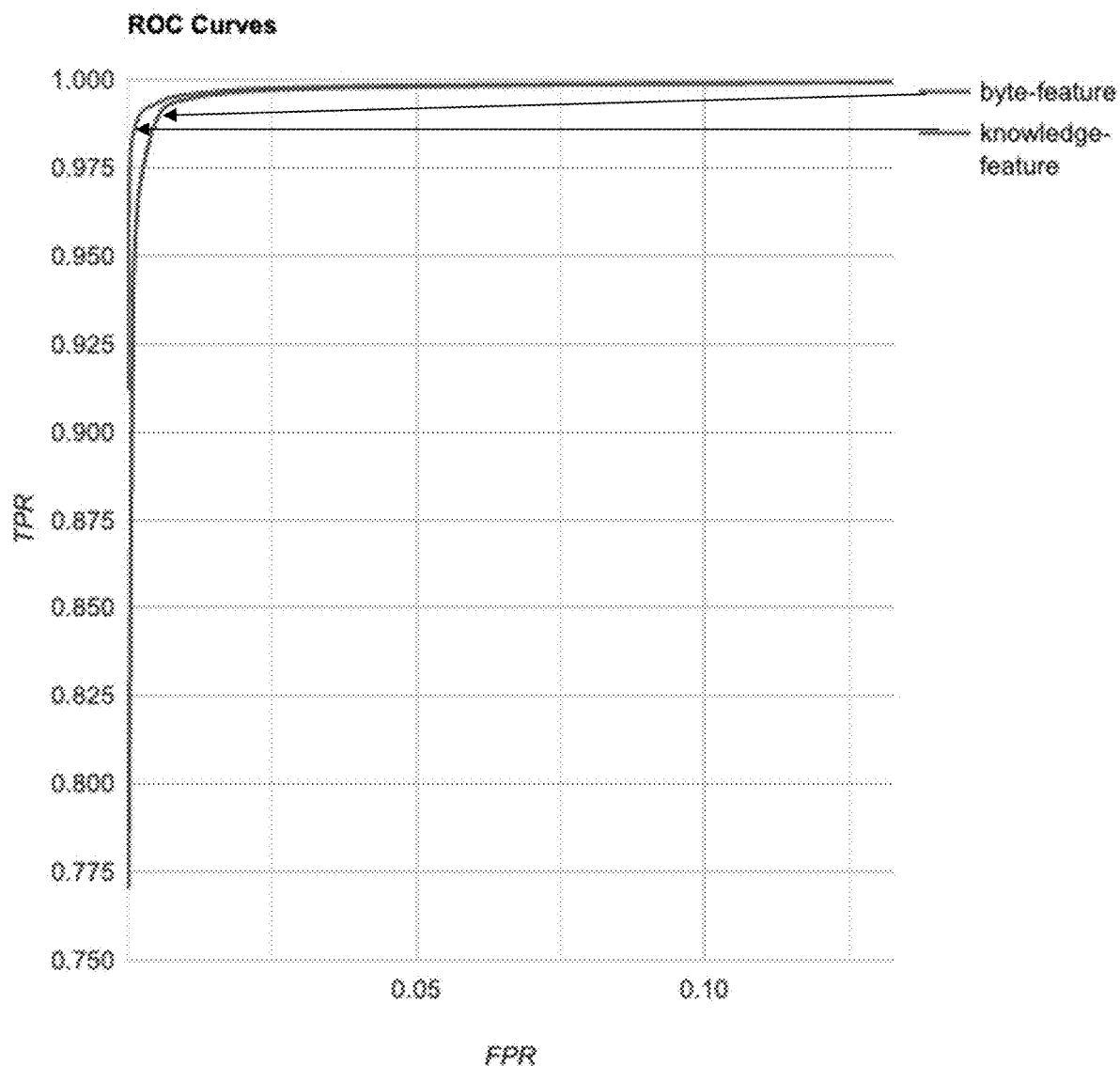
FIG. 5 is a graph of ROC (Receiver Operating Characteristic) curves for a byte-feature, which is the conventional approach and a knowledge-feature based on the present disclosure.

FIG. 5 is a graph of ROC (Receiver Operating Characteristic) curves for a byte-feature, which is the conventional approach and a knowledge-feature based on the present disclosure. Specifically, FIG. 5 illustrates the effectiveness of the present disclosure in training a machine learning model to detect malicious executable files. FIG. 5 shows the model with knowledge features needs a much smaller training dataset and much less training time while achieving better accuracy.

For example, the following example costs were seen using the conventional approach (non-knowledge features) and the present disclosure (knowledge features).

|  | Non-knowledge features | Knowledge features |
| --- | --- | --- |
| Training data size | 40 million | 14 million |
| Training time (64 cores) | 56 hours | 3 hours |

As is appreciated, taking 56 hours to train or retrain a machine learning model does not meet the agility requirement by a production system, e.g., the cloud-based system 100.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming one or more processors to perform steps of:
monitoring executable files in production traffic;
determining a plurality of features associated with the executable files that are effective to use for training a machine learning model based on the monitoring, wherein the plurality of features are each based on static properties in predefined structure of the executable files, and wherein the plurality of features include section details, each section being a segment of divided memory;
obtaining training data that includes samples of benign executable files and malicious executable files;
extracting the plurality of features from the training data; and
utilizing the extracted plurality of features to train the machine learning model to detect malicious executable files.

2. The non-transitory computer-readable storage medium of claim 1, wherein the steps further include
providing the machine learning model for use in production to detect executable files.

3. The non-transitory computer-readable storage medium of claim 1, wherein the steps further include
obtaining data related to use of the machine learning model in production, wherein the data is obtained by monitoring traffic associated with users; and
updating the training of the machine learning model based on the data.

4. The non-transitory computer-readable storage medium of claim 3, wherein the machine learning model is used in production in a cloud-based system, and wherein the updated trained machine learning model is distributed to a plurality of enforcement nodes via a central authority.

5. The non-transitory computer-readable storage medium of claim 1, wherein the steps further include
obtaining data related to a sandbox of executable files;
determining effectiveness of the machine learning model based on comparing results from the machine learning model and the data; and
updating the plurality of features based on the comparing.

6. The non-transitory computer-readable storage medium of claim 5, wherein the sandbox is associated with a cloud-based system.

7. The non-transitory computer-readable storage medium of claim 1, wherein the executable file is a Portable Executable (PE) file.

8. The non-transitory computer-readable storage medium of claim 1, wherein the static properties include any of file header information, file section details, file name anomalies, a digital certificate, and import/export detail.

9. A method comprising:
monitoring executable files in production traffic;
determining a plurality of features associated with the executable files that are effective to use for training a machine learning model based on the monitoring, wherein the plurality of features are each based on static properties in predefined structure of the executable files, and wherein the plurality of features include section details, each section being a segment of divided memory;
obtaining training data that includes samples of benign executable files and malicious executable files;
extracting the plurality of features from the training data; and
utilizing the extracted plurality of features to train the machine learning model to detect malicious executable files.

10. The method of claim 9, further comprising
providing the machine learning model for use in production to detect executable files.

11. The method of claim 9, further comprising
obtaining data related to use of the machine learning model in production, wherein the data is obtained by monitoring traffic associated with users; and
updating the training of the machine learning model based on the data.

12. The method of claim 11, wherein the machine learning model is used in production in a cloud-based system, and wherein the updated trained machine learning model is distributed to a plurality of enforcement nodes via a central authority.

13. The method of claim 9, further comprising
obtaining data related to a sandbox of executable files;
determining effectiveness of the machine learning model based comparing results from the machine learning model and the data; and
updating the plurality of features based on the comparing.

14. The method of claim 13, wherein the sandbox is associated with a cloud-based system.

15. The method of claim 9, wherein the executable file is a Portable Executable (PE) file.

16. The method of claim 9, wherein the static properties include any of file header information, file section details, file name anomalies, a digital certificate, and import/export detail.

17. A server comprising:
one or more processors; and
memory storing instructions that, when executed, cause the one or more processors to
monitor executable files in production traffic;
determine a plurality of features associated with h executable files that are effective to use for training a machine learning model based on the monitoring, structure of the executable files, and wherein the plurality of features include section details, each section being a segment of divided memory;
obtain training data that includes samples of benign executable files and malicious executable files;
extract the plurality of features from the training data; and
utilize the extracted plurality of features to train the machine learning model to detect malicious executable files.

18. The server of claim 17, wherein the instructions that, when executed, cause the one or more processors to provide the machine learning model for use in production to detect executable files.

19. The server of claim 17, wherein the instructions that, when executed, cause the one or more processors to
obtain data related to use of the machine learning model in production, wherein the data is obtained by monitoring traffic associated with users; and
update the training of the machine learning model based on the data.

20. The server of claim 17, wherein the static properties include any of file header information, file section details, file name anomalies, a digital certificate, and import/export detail.

* * * * *